United States Patent
Lee et al.

(10) Patent No.: US 10,049,422 B2
(45) Date of Patent: Aug. 14, 2018

(54) TEMPLATE-BASED WATERMARKING METHOD FOR DEPTH-IMAGE-BASED RENDERING BASED 3D IMAGE AND APPARATUS THEREOF

(71) Applicant: Korea Advanced Institute of Science and Technology, Daejeon (KR)

(72) Inventors: Heung-Kyu Lee, Daejeon (KR); Wookhyung Kim, Daejeon (KR); Seunghun Nam, Daejeon (KR); Ji-hyun Kang, Daejeon (KR); Jong-Uk Hou, Daejeon (KR); Han-ul Jang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 64 days.

(21) Appl. No.: 15/244,004

(22) Filed: Aug. 23, 2016

(65) Prior Publication Data

US 2017/0249715 A1 Aug. 31, 2017

(30) Foreign Application Priority Data

Feb. 29, 2016 (KR) ........................ 10-2016-0023929

(51) Int. Cl.
*G06T 1/00* (2006.01)
(52) U.S. Cl.
CPC ............ *G06T 1/0064* (2013.01); *G06T 1/005* (2013.01); *G06T 2201/0052* (2013.01); *G06T 2201/0061* (2013.01)

(58) Field of Classification Search
None
See application file for complete search history.

(56) References Cited

FOREIGN PATENT DOCUMENTS

CN 102117474 A * 7/2011 ............... G06T 1/00

OTHER PUBLICATIONS

Wang, Y.G.—"An improved AQIM watermarking method with minimum-distortion angle quantization and amplitude projection strategy"—Elsevier 2015, pp. 40-53 (Year: 2015).*

* cited by examiner

*Primary Examiner* — Bernard Krasnic
(74) *Attorney, Agent, or Firm* — Pearl Cohen Zedek Latzer Baratz LLP

(57) ABSTRACT

Provided are a template-based watermarking method for a DIBR 3D image and an apparatus thereof. The method includes: determining a template watermark inserting area and a message watermark inserting area in spatial domain of an image; transforming the determined template watermark inserting area into a frequency domain to insert at least one preset template watermark and transforming the determined message watermark inserting area into a frequency domain to insert a preset message watermark; and transforming the template watermark inserting area, into which the template watermark is inserted, into a spatial domain and transforming the message watermark inserting area, into which the message watermark is inserted, into a spatial domain.

10 Claims, 9 Drawing Sheets

FIG. 6

1: $S_f = [0.7, 0.75, ..., 1.5]$
2: Load $T_f$
3: for $x = 0 : w - 1$ do
4:     for $y = 0 : h-1$ do
5:         $t_s = \text{image}(x : x + d_s, y : y + d_s)$
6:         Calculate $T(k/d, k/d)$ from $t_s$
7:         for $j = 1 : n$ do
8:             if $|\angle T(k/d, k/d) + \angle T_f(j) + c| < \tau$ them
9:                 $\text{image}_r(p,q) = \text{image}(p/S_f(j), q/S_f(j))$
10:                $x_r = \text{round}(x/S_f(j))$
11:                $y_r = \text{round}(y/S_f(j))$
12:                $t = (\text{image}_r(x_r : x + d, y_r : y_r + d)$
13:                Calculate $T[k-1, k]$ from $t$
14:                if $Q_D(T[k-1, k]) = 1$ then
15:                   Calculate $T[k, k-1]$ from $t$
16:                   if $Q_D(T[k, k-1]) = 1$ then
17:                       Add 1 to count $(x, y, S_f(j))$
18:                   end if
19:                 end if
20:             end if
21:         end for
22:     end for
23: end for
24: Synchronize the image by using count

TEMPLATE-BASED WATERMARKING METHOD FOR DEPTH-IMAGE-BASED RENDERING BASED 3D IMAGE AND APPARATUS THEREOF

CROSS-REFERENCE TO RELATED APPLICATION(S)

This application claims the benefit under 35 U.S.C. § 119(a) of a Korean patent application filed on Feb. 29, 2016 in the Korean Intellectual Property Office and assigned Serial number 10-2016-0023929, the entire disclosure of which is hereby incorporated by reference.

TECHNICAL FIELD

The present invention relates to a template-based watermarking technique, and more particularly, to a template-based watermarking method and an apparatus thereof which are robust against a depth-image-based rendering (DIBR) transformation and are to protect the copyright of a DIBR 3D image.

BACKGROUND

In recent years, 3D techniques have been greatly advanced. Various applications have been developed for a 3D display which is one of output devices giving the most sense of immersion. A 3D display of a stereoscopic manner using two images (or photographs) is widely used in a movie theater and as a home TV. In recent years, the 3D display is combined with UHD so that the reality is enhanced and HMD is widely distributed due to the development of a small size display. Thus, it is expected that techniques related to the 3D display is consistently developed and the market will be more grown in future.

In this situation, DIBR has taken an important role. The DIBR is a scheme that generates an image having several viewpoints by using a central image and a depth image. This scheme has merits which can easily store and transmit the image due to a small size as compared with that of a stereoscopic scheme having an image of all viewpoints, and can control the value of a depth factor (baseline distance) for user convenience. Due to those merits, the DIBR is variously utilized for a multi-view which gives various viewpoints, auto-stereoscopy which enables a user to see a 3D image without any 3D glasses, a 2D-to-3D conversion which converts a previously taken 2D image into a 3D image, etc.

As techniques related to DIBR are developed, there has risen a need to provide a technique of protecting copyright of DIBR contents. Although there is a watermarking scheme that is the most typical scheme of protecting contents, it is difficult to apply the watermarking scheme according to the related art used for a 2D image to the DIBR technique.

For example, a content user may generate several synthesized images having new viewpoints based on an image provided from a content provider.

In such a DIBR system, since the content provider can insert a watermark only into a central image and cannot insert a watermark into a synthesized image newly created by a content user, the DIBR may treat the image as one attack on the central image.

However, since the DIBR is a non-linear geometric distortion in which all pixels travel mutually different distances in a horizontal direction, when a 2D watermark of the related art is used, it is difficult to detect the watermark so that it is difficult to protect the copyright of an image synthesized by a user.

To solve the problem, there have been proposed several DIBR watermarking techniques.

As one example, a watermark is inserted by previously predicting a degree of a movement of a central image pixel by using a depth image. Thus, three watermarks, that is, central image watermark and left eye and right eye image watermarks are inserted into the central image. In this case, it is easy to detect a watermark even after DIBR and, even after a JPEG noise addition which is the most common distortion, the high detecting rate may be obtained.

However, since a degree of a movement of a pixel is predicted by using a depth map, the watermark is modified due to a depth map preprocessing and is weak when the depth factor value is changed. In addition, the technique is not suitable to be used for Multiview video plus depth (MVD) in which several viewpoints are generated and the 2D-to-3D conversion in which any depth maps do not exist.

As another example of the technique, a watermark is inserted by applying a quantization scheme to a dual-tree complex wavelet transform (DT-CWT) domain. This scheme uses a DT-CWT coefficient having the smallest directional variation among DT-CWT coefficients after DIBR transformation. In addition, the technique is designed to perform the quantization in units of row by using the property of the DIBR in which only a horizontal movement exists, so that the technique is robust against DIBR. Since the technique is also robust against the depth map preprocessing and the baseline distance adjustment as well as the DIBR and the JPEG compression and size scaling, the technique is suitable to be used for the MVD and the 2D-to-3D conversion.

However, the number of inserted bits is limited, and the technique is vulnerable to a noise adding and a geometric distortion such as a cropping.

As still another example of the technique, there is a watermarking scheme using a scale invariant feature transform (SIFT) matching. According to the technique, a watermark is inserted into a common part between a central image and a synthesized image which is detected through SIFT. Since the technique utilizes a matching scheme, the technique is robust against the DIBR and has a high PSNR. In addition, the technique is greatly robust against JPEG compression and median filtering.

However, since a descriptor separately stored in the SIFT matching process is required, it is difficult to perform blind detection so that the utility is deteriorated.

Therefore, there is a need to provide a watermarking method which is capable of compensating weakness of the methods of the related art.

SUMMARY

Accordingly, an aspect of the present disclosure is to provide a template-based watermarking method which can be robust against depth-image-based rendering (DIBR) and protect copyright of a DIBR 3D image and an apparatus thereof.

In accordance with one aspect of the present disclosure, there is provided a method of inserting a watermark based on a template. The method includes: determining a template watermark inserting area and a message watermark inserting area in spatial domain of an image; transforming the determined template watermark inserting area into a frequency domain to insert at least one preset template watermark and transforming the determined message watermark inserting area into a frequency domain to insert a preset message watermark; and transforming the template watermark inserting area, into which the template watermark is inserted, into a spatial domain and transforming the message watermark inserting area, into which the message watermark is inserted, into a spatial domain.

The method further includes dividing the determined template watermark inserting area into a plurality of first blocks each of which has a predetermined first size, and dividing the determined message watermark inserting area into a plurality of second blocks each of which has a predetermined second size, wherein the template watermark is inserted into the plurality of first blocks transformed into the frequency domain, and the message watermark is inserted into the plurality of second blocks transformed into the frequency domain.

The template watermark is inserted into the template watermark inserting area which is transformed into the frequency domain through an improved angle quantization index modulation (IAQIM) scheme.

The message watermark is equally inserted into each of columns included in each of the second blocks transformed into the frequency domain.

The determined template watermark inserting area is divided into the first blocks having the first size smaller than a predetermined size. In this case, the present invention may use a transforming area to achieve an effect equivalent to that of the insertion of the watermark.

A plurality of horizontal line areas, which have a predetermined width and are spaced part from each other by a predetermined interval, and a vertical line area having the predetermined width are determined as the template watermark inserting area in the spatial domain of the image, and a remaining area except for the determined template watermark inserting area is determined as the message watermark inserting area.

In accordance with another aspect of the present disclosure, there is provided a method of extracting a watermark based on a template. The method includes: rescaling a watermark extracting image given to extract the watermark by using at least one predetermined scaling factor; detecting a template watermark inserting area, into which at least one preset template watermark is inserted, based on the watermark extracting image rescaled by each scaling factor; synchronizing a geometric property of the watermark extracting image with a geometric property of an original image based on the scaling factor and the detected template watermark inserting area such that the geometric property of the watermark extracting image corresponds to the geometric property of the original image; and extracting a message watermark from a preset message watermark inserting area of the synchronized watermark extracting image.

The detecting of the template watermark inserting area includes: transforming the watermark extracting image rescaled by each of the scaling factors from a spatial domain to a frequency domain; calculating a count value satisfying a preset template extraction condition with respect to the watermark extracting image rescaled by each of the scaling factors and transformed into the frequency domain; selecting a scaling factor having a maximum counting value among the count values calculated with respect to the scaling factors; and detecting the template watermark inserting area from the watermark extracting image rescaled by the selected scaling factor and transformed into the frequency domain.

The synchronizing between the geometric property of the watermark extracting image and the geometric property of the original image includes: generating a rescaled watermark extracting image by rescaling a size of the watermark extracting image with the selected scaling factor such that the size of the watermark extracting image corresponds to a size of the original image; and restoring the rescaled watermark extracting image to the synchronized watermark extracting image by moving the rescaled watermark extracting image such that the template watermark inserting area of the generated rescaled watermark extracting image corresponds to the template watermark inserting area of the original image.

The detecting of the template watermark inserting area includes: extracting at least one template watermark from the watermark extracting image rescaled with the selected scaling factor through an improved angle quantization index modulation (IAQIM) scheme and transformed into a frequency domain, and detecting the template watermark inserting area based on the extracted template watermark.

The extracting of the message watermark includes: dividing the message watermark inserting area into a plurality of blocks each having a predetermined size; transforming the divided blocks from a spatial domain to a frequency domain, respectively; and extracting the message watermark based on correlation between each of the blocks transformed into the frequency domain and a preset original message watermark.

In accordance with still another aspect of the present disclosure, there is provided an apparatus for inserting a watermark based on a template. The apparatus includes: a determining unit configured to determine a template watermark inserting area and a message watermark inserting area in spatial domain of an image; a transforming unit configured to transform the determined template watermark inserting area into a frequency domain to insert at least one preset template watermark and to transform the determined message watermark inserting area into a frequency domain to insert a preset message watermark; and a transforming unit configured to transform the template watermark inserting area, into which the template watermark is inserted, into a spatial domain and to transform the message watermark inserting area, into which the message watermark is inserted, into a spatial domain.

In accordance with still another aspect of the present disclosure, there is provided an apparatus for extracting a watermark based on a template. The apparatus includes: a rescaling unit configured to rescale a watermark extracting image given to extract the watermark by using at least one predetermined scaling factor; a detecting unit configured to detect a template watermark inserting area, into which at least one preset template watermark is inserted, based on the watermark extracting image rescaled by each scaling factor; a synchronizing unit configured to synchronize a geometric property of the watermark extracting image with a geometric property of an original image based on the scaling factor and the detected template watermark inserting area such that the geometric property of the watermark extracting image corresponds to the geometric property of the original image; and an extracting unit configured to extract a message watermark from a preset message watermark inserting area of the synchronized watermark extracting image.

According to an embodiment of the present invention, there is provided a template watermarking scheme which is applicable to DIBR and is robust against DIBR transformation, so that the copyright of a DIBR 3D image can be protected.

Thus, the amount of the damage may be reduced by detecting a DIBR 3D damaged due to illegality and the right of a copyright holder is protected, so that it may be encouraged to produce contents having a good quality.

Specifically, in case of a 3D image, since the producing cost of a 3D image is greater than that of a 2D image, the present invention may be more effective on the copyright protection of a 3D image.

In addition, differently from a 2D watermarking scheme of the related art, a watermarking method according to an embodiment of the present invention performs a watermarking operation by using a 1D signal, so that the watermarking method may have high robustness, guarantees a high quality of an image, a large inserting amount of data, and sufficient robustness against various kinds of attacks, and protect the copyright even when a central image, or left or right eye image is illegally leaked.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present invention will be more apparent from the following description taken in conjunction with the accompanying drawings, in which:

FIG. 6 is a view illustrating a fast algorithm of extracting a template;

Throughout the drawings, it should be noted that like reference numbers are used to depict the same or similar elements, features, and structures.

DETAILED DESCRIPTION

Figure 1:
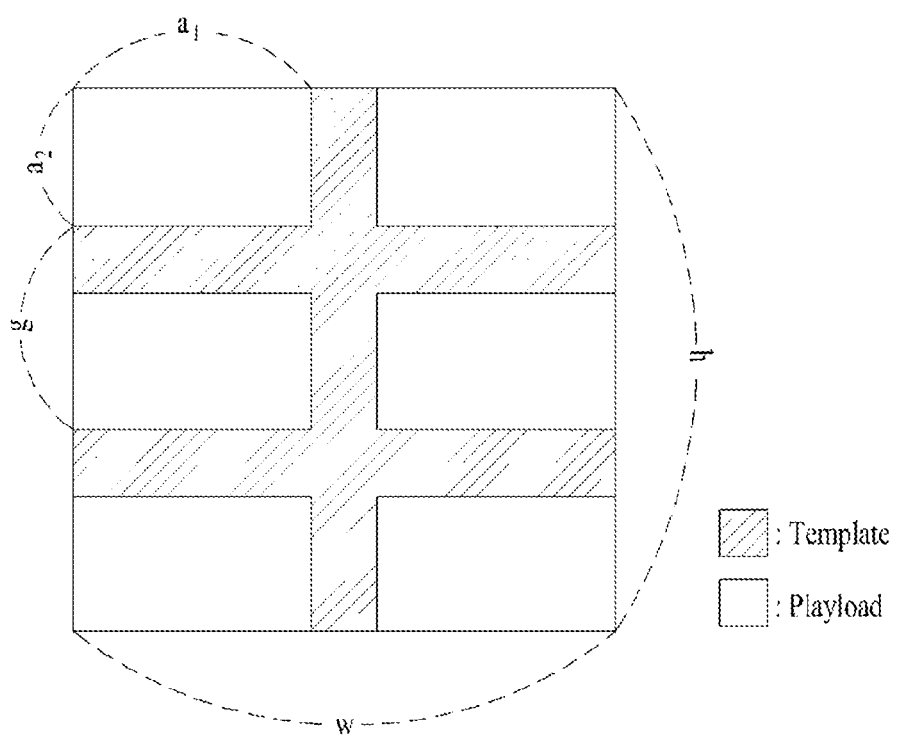
FIG. 1 is a view illustrating one example of template and message watermark inserting areas.

Hereinafter, embodiments according to the present invention will be described with reference to accompanying drawings, but the present invention is not limited thereto. The same reference numerals used in each drawing represent the same elements.

The subject matter of the embodiments of the present is to provide a template-based watermarking technique which is robust against a depth-image-based rendering (DIBR) transformation and protects the copyright of a DIBR 3D image.

In this case, according to embodiments of the present invention, two kinds of watermarks, that is, template and message watermarks may be inserted, where the template watermark may be inserted into a small block and the message watermark may be identically inserted into a transformation domain such as a DCT domain or a DFT domain in units of column.

Since the template watermark is inserted into a block having a preset size or less, the probability that the template watermark survives is high. In addition, since a pixel moves only in a horizontal direction due to a property of the DIBR, the message watermark may survive due to the linearity of the transformation domain.

Thus, in terms of the quality of an image, the amount of inserted information and the robustness, the performance of the watermark technique according to an embodiment of the present invention may be more excellent than that of a DIBR watermarking technique of the related art.

The present invention proposes a template-based blind watermarking scheme. A template may be inserted into a phase of a DFT domain through a quantization index modulation (QIM) scheme. When size changing and cropping attacks causing a geometric distortion are made on the template, the template may be designed to perform a motive function of restoring a size and a position of an image to those of an original image. A meaningful message such as user information may be inserted into the DCT domain. The same watermarks are inserted into 1D-DCT domain in units of column by using the linearity of the DCT, so that the present invention is robust against the DIBR. In addition, like JPEG, the present invention may be robust against a general signal distortion such as a noise addition and may have a high detection rate even in case of depth preprocessing greatly concerned with the DIBR and a depth factor value adjustment. In advance, the present invention is robust even against a size variation and a cropping.

Hereinafter, the DIBR and improved angle quantization index modulation (IAQIM) will be described. In addition, a main property of a watermarking scheme using properties of DFT and 1D-DCT will be described and then, a scheme of embedding and decoding a watermark according to the present invention will be described.

1. DIBR and IAQIM

The DIBR is a scheme that creates two color images (left eye right eye) using one color image (central image) and one gray image (depth image) or a virtual image having the virtual viewpoints or more, has an important role in various applications due to a merit of being capable of combining viewpoints to be suitable to user convenience.

The IAQIM, which is one kind of QIM, strengthens the weakness of a QIM scheme to a gain attack, so that the IAQIM solves a sub-optimal quantization problem, thereby minimizing an embedding distortion.

The whole process of the DIBR includes three steps of a depth map preprocessing, a pixel location warping and a hole-filling.

The map preprocessing step reduces the number of holes to improve the quality of a rendered image. Since the DIBR is a process of generating a new viewpoint, a region having no pixel information, which is called a 'hole' which is a main factor of deteriorating the quality of an image, is generated.

Since many holes are specifically generated at a portion in which a depth difference is rapidly caused, the preprocessing step such as depth map smoothing is performed so that the number of holes is reduced, thereby improving the image quality. For example, when the depth map preprocessing is applied to the image, to which the depth map preprocessing is not applied, the number of holes is reduced so that the quality of the image may be improved. However, the horizontal length of an object in the image may be varied.

The second step of pixel location warping moves the location of a pixel left/right to allow a user to feel a three-dimensional effect. The pixel location warping may be performed through following Equation 1.

$$x_L = x_C + \left(\frac{t_x}{2} \times \frac{f}{Z}\right)$$
$$x_L = x_C + \left(\frac{t_x}{2} \times \frac{f}{Z}\right)$$

[Equation 1]

Wherein $x_C$ represents a pixel coordinate location of a central image (or a central picture) on an x-axis, $x_L$ represents pixel coordinate locations of left and right eye images corresponding to $x_C$ on the x-axis, $t_x$ represents a depth factor value, f represents a focal length of a camera, and Z is a pixel value of an image which may represent depth information.

In this case, as the value of $t_x$ is increased, the image may be synthesized at a viewpoint which is more far away from the center.

During warping, two pixels or more may move while overlapping each other.

In this case, a pixel having a high Z value is selected to prevent a parallax reversal that a distant object is viewed through a near object from occurring.

In the final step of hole-filling, the hole generated after the pixel location warping is filled with information made. The hole-filling scheme may include an interpolation scheme, an in-painting scheme, etc.

In DIBR, a pixel moves only in a horizontal direction, and the moving degree is determined by the depth. When the DIBR is performed to render the block of m×n, the block may be modeled by approximating the block as following Equation 2.

$$D(I_{:,j}) = D([I(1, j), I(2, j), \ldots, I(m, j)])$$
$$= [I(1 + d(v), j), \ldots, I(m + d(v), j)]$$

[Equation 2]

Wherein D represents a DIBR attack, d0 represent a pixel location warping function for generating an integer within [0, v], $I_{:,j}$ represents the j-th row, I(I, j) represents a pixel intensity at (I, j), v is a value which is proportional to a depth variation.

If the DIBR attack of the unit of row extends to the unit of entire block, the DIBR attack may be defined as following Equation 3.

$$D(I) = [D(I_{:,1})^T, D(I_{:,2})^T, \ldots, D(I_{:,n})^T]^T$$

[Equation 3]

Differently from a translation in which a pixel moves according to a specific regulation, since a pixel moves irregularly in the DIBR process, it is safe to understand that the image contents are modified. Thus, the coefficient of the transformed domain into which the watermark is inserted may be modified, which is confirmed from PSNRs of the coefficients before and after DIBR.

Following Table 1 shows PSNRs of coefficients before and after DIBR of a typical transformed domain into which a water mark is inserted.

TABLE 1

|  | 2D DCT | 2D DFT | 2D DWT |
|---|---|---|---|
| PSNR | 23.68 dB | 26.54 dB | 31.22 dB |

In Table 1, the used depth factor value is 5% of the width of an image, and a focus length is 1. The less the PSNR is, the greater the coefficient of the transformed watermark is modified. For this reason, the 2D watermark of the related art cannot be applied to DIBR.

However, when an image is divided into small blocks, there may exist a non-modified block because objects have similar values to each other. In this case, when all depths of a block are equal to each other, the value of v in Equation 2 is 0 (zero), so that, although movements (transformations) occur in the entire block, any modification does not occur in the image. In addition, as the size of the block is reduced, the ratio of non-modified blocks is increased. This is shown in following Table 2.

TABLE 2

|  | Block size | | | |
|---|---|---|---|---|
|  | 10 * 10 | 20 * 20 | 40 * 40 | 80 * 80 |
| Distortionless block (%) | 85.68 | 70.67 | 48.35 | 24.49 |

Table 2 shows measured average percentages of the blocks non-modified after DIBR is applied to about 3000 images. As shown in Table 2, it may be understood that the smaller the block size is, the greater the ratio of the non-modified blocks is.

The present invention provides a template-based DIBR watermarking scheme by using the characteristics of DIBR. A watermarking scheme according to an embodiment of the present invention includes a template and a message watermark.

Explaining a DRBR template, the template is one of typical schemes providing a geometric invariant watermark and robust against geometric distortion. Although a template according to the related art is generally designed to be robust against a linear distortion, as shown in Table 1, the coefficient of the domain modified by DIBR is modified, so that it is difficult to apply the template to DIBR.

In order for the template to be robust against DIBR, the present invention utilizes the facts that only a horizontal movement occurs in DIBR and when the size of a block is small, the probability that the block is not modified is high. In this case, template decoding may be performed through a majority decision scheme in units of column (or row) and the block may have a sufficient size to be robust against a DIBR attack.

A message watermark for a data payload will be described. As shown in Table 1, a 2D watermarking scheme according to the related art is vulnerable to DIBR because the coefficient is modified due to DIBR. The present invention is to provide a watermark robust against DIBR by utilizing the fact that only a horizontal movement exists in DIBR. Differently from the related art, according to the present invention, a watermark is inserted in units of 1D, that is, column (or row).

In addition, in such a manner that the same watermarks are inserted into all columns in one block, the insertion of a watermark into a block of m×n may be expressed as following Equation 4.

$$DCT(I'_{:,i}) = DCT(I_{:,i}) + w$$

[Equation 4]

Wherein $I_i$: represents the i-th column, $W=[w_1, w_2, \ldots w_n]$ represents a watermark, and $I'_{i,:}$ represents the i-th column into which the watermark is inserted. As known from Equation 4, watermark W is inserted into the DCT domain of the i-th column and this operation is repeatedly performed for all columns.

The DIBR attack may occur not in the transformed domain but in a spatial domain. When the Equation 4 is transformed to the spatial domain, the Equation 4 may be expressed as following Equation 5.

$$I'_{i,:} = IDCT(DCT(I'_{i,:})) \quad \text{[Equation 5]}$$
$$= IDCT(DCT(I_{i,:}) + w) = I_{i,:} + IDCT(w)$$
$$= I_{i,:} + v$$

Wherein $v=[v_1, v_2, \ldots, v_n]^T$ represents a watermark transformed into the spatial domain.

Watermark V is equally inserted into all columns of an image. Since this has the same component $v_j$ along each horizontal axis (or lateral axis), V inserted into the whole image may have DIBR invariance expressed as following Equation 6.

$$D([v, v, \ldots, v]) = \begin{bmatrix} v_1 & v_1 & \ldots & v_1 \\ v_2 & v_2 & \ldots & v_2 \\ \vdots & \vdots & \ddots & \vdots \\ v_n & v_n & \ldots & v_n \end{bmatrix} = [v, v, \ldots, v] \quad \text{[Equation 6]}$$

Wherein D( ) represents a DIBR attack.

When 1D DCT is used, $I'_{i,:}$ for the DIBR attack may be divided into two items expressed as following Equation 7.

$$DCT(D(I'_{i,:})) = DCT(D(I_{i,:} + v)) \quad \text{[Equation 7]}$$
$$= DCT(D(I_{i,:}) + D(v))$$
$$= DCT(D(I_{i,:}) + v)$$
$$= DCT(D(I_{i,:})) + DCT(v)$$
$$= DCT(D(I_{i,:})) + w.$$

As known through Equation 7, the watermark signal embedded in an image may be robust against a DIBR attack. Thus, the present invention may provide a watermark robust against a DIBR attack because of the invariance of the message watermark.

Hereinafter, a process of inserting a template of the present invention and a process of inserting a message watermark will be described.

As shown in FIG. 1, the template and the message watermark according to the present invention are inserted into mutually different areas. The message watermark inserted into a 1D-DCT domain and the template inserted into a 2D-DFT domain will be described in detail below.

1. Partitioning Area

As shown in FIG. 1, in order to prevent the template and message watermark from interfering with each other, they are inserted after the inserting region or area is divided. The template of two lines is inserted in a horizontal direction and the template of one line is inserted in a vertical direction.

In this case, the reason for inserting two lines in a horizontal direction is to estimate a scaling factor by using a distance between two lines. Of course, the template is not limited to two lines inserted in a horizontal direction and one line inserted in a vertical direction. If necessary, the number of areas into which the template is inserted in the horizontal direction and the number of areas into which the template is inserted in the vertical direction may be changed.

An inserting location of the template may be defined as following Equation 8.

$$t_0 = \text{image}(a_1:a_1+d-1,:)$$
$$t_1 = \text{image}(:,a_2:a_2+d-1)$$
$$t_2 = \text{image}(:,a_2+g:a_2+g+d-1) \quad \text{[Equation 8]}$$

Wherein $t_0$ represents a template inserted in a vertical direction, $t_1$ and $t_2$ represent two templates inserted in a horizontal direction, d represents a width of a template, g represents a distance between $t_1$ and $t_2$, and $a_1$ and $a_2$ are arbitrary values set (designated) by a user. $a_1$ and $a_2$ may be set arbitrary values which avoid edges of an image.

In this case, g, $a_1$ and $a_2$ may be clues to estimation of geometric specification in a watermark extracting process.

The message watermark may be inserted into a remaining area or at a remaining location, the remaining part may be synthesized with an image of $(w-d) \times (h-2d)$, and it may be used for message watermarking.

After all watermarks are inserted, split areas are synthesized with each other and merged into the image again.

2. Template Embedding

As shown in FIG. 1, the template of the present invention is embedded in the template inserting area. In this case, according to the present invention, the template may be embedded through an IAQIM scheme to have a robust property to a size variation and a lane quantization problem. The reason is because the IAQIM scheme solves the size changing weakness and the lane quantization problem.

The template is inserted by moving a window of a preset size, for example, g×g from the leftmost portion (upper portion in case of a vertical template) of the image toward the right side (the low side in case of the vertical template) one pixel by one pixel.

In this case, three templates per a block may be inserted to reduce false-positive.

Notation $t_{ij} = t_i(1:d, j:j+d-1)$ may be used for the template insertion, wherein i is 0, 1 or 2, and j is 0, 1, 2, ..., or end. In this case, the transpose of $t_0$ defined above is used as the transpose of $t_0$ to be used. The 'end' of j may be w−d when i is 0, or h−d when i is 1 or 2.

Figure 2:
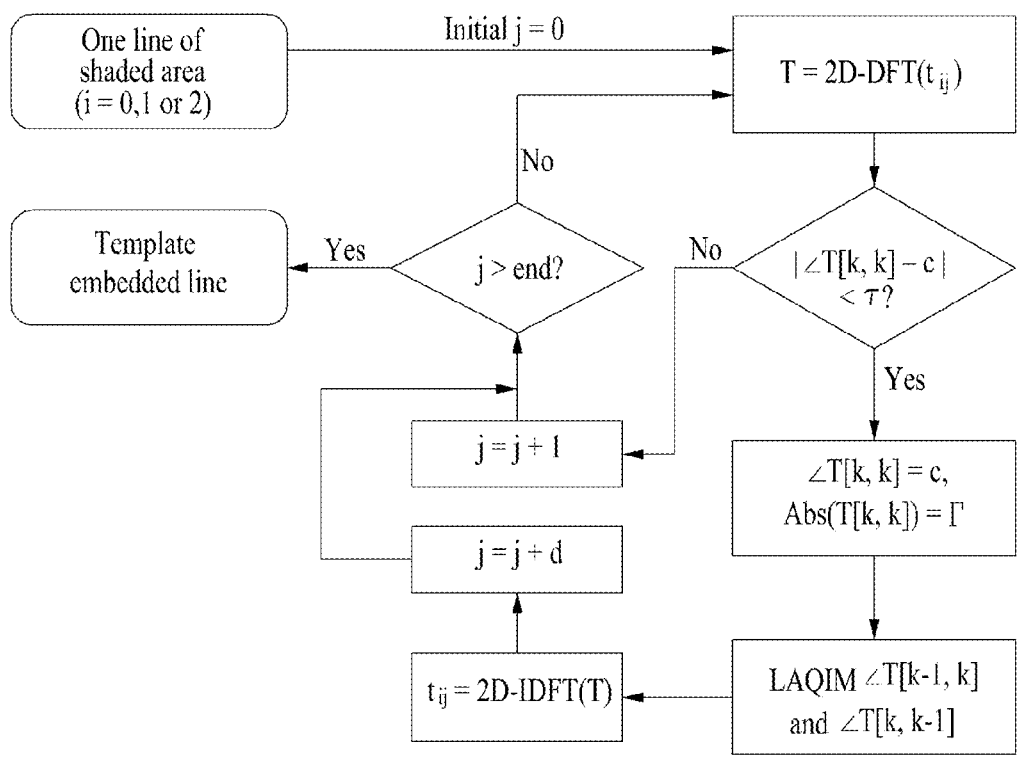
FIG. 2 is a flowchart illustrating a process of inserting a template watermark according to an embodiment.

As shown in FIG. 2, the template embedding is implemented through following steps.

(1) 2D-DFT: 2D block DFT of d×d size is applied to $t_{ij}$ and initial values of i and j are 0.

(2) Angle thresholding: when following Equation 9 is satisfied, a template is embedded according to the present invention.

$$|\angle(T[k,k]) + c| < \tau \quad \text{[Equation 9]}$$

Wherein T[k, k] represents DFT coefficients of a predefined intermediate frequency, c represents a value of the template generated by a secret key, and τ represents a threshold value.

The corresponding condition is for the purpose of preventing great distortion due to the template embedding. When the corresponding condition is not satisfied, the process of embedding the current block is terminated and after adding 1 to j, the process goes back to the step (1).

(3) Template 1 Embedding: Template 1 is Embedded as Following Equation 10.

$$\angle(T[k,k])=c, \text{Abs}(T[k,k])=\Gamma \qquad \text{[Equation 10]}$$

Wherein $\Gamma$ represents an amplification factor and a corresponding factor enhances the robustness.

(4) Templates 2 and 3 embedding through IAQIM scheme: bit=1 is inserted by applying the IAQIM scheme to $\angle T[k-1, k]$ and $\angle T[k, k-1]$, wherein template 2 is inserted into $\angle T[k-1, k]$, and template 3 is inserted into $\angle T[k, k-1]$.

Figure 4:
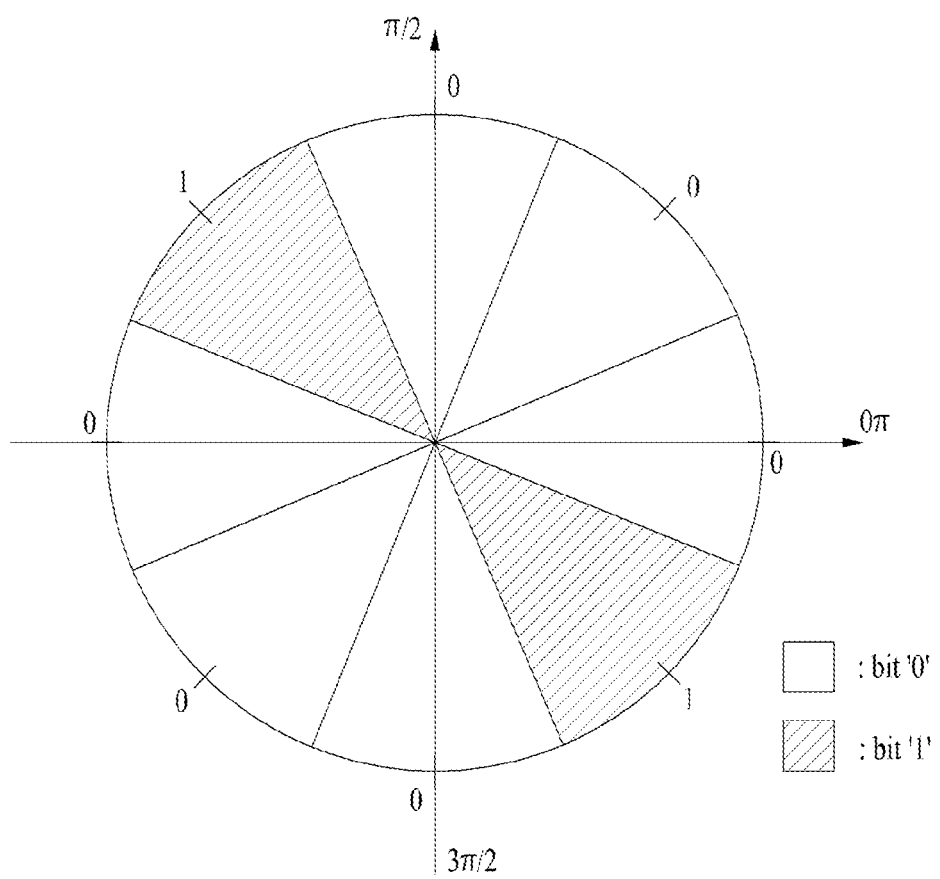
FIG. 4 is a view illustrating an amended IAQIM for embedding a template when k=4.

According to the present invention, the quantization table shown in FIG. 4 may be adjusted to reduce false-positive during a decoding operation. Thus, the IAQIM equation for inserting a template may be expressed as following Equation 11.

$$Q_E(\theta) = \Delta \cdot \left\lfloor \frac{\theta}{\Delta} \right\rfloor + \frac{\Delta}{2} - \Delta \cdot \left(\left\lfloor \frac{\theta}{\Delta} \right\rfloor \bmod 2\right) \qquad \text{[Equation 11]}$$

Wherein, since a template is embedded only by bit=1, any equations for embedding a template by bit=0 are not required.

(5) 2D-IDFT: IDFT is performed on a template-inserted block. When the template embedding of a current block is completed, after adding d to j and going back to step (1), the template inserting is repeated.

The steps (1) to (5) described above are repeatedly performed for i=1, 2, 3. Although only modification of T[k, k] is shown in the present invention for convenience, since T[k, k]=conj(T[d−k, d−k]) in a real image, it should be understood that T[d−k, d−k]) must be modified like T[k, k].

3. Message Embedding

Figure 3:
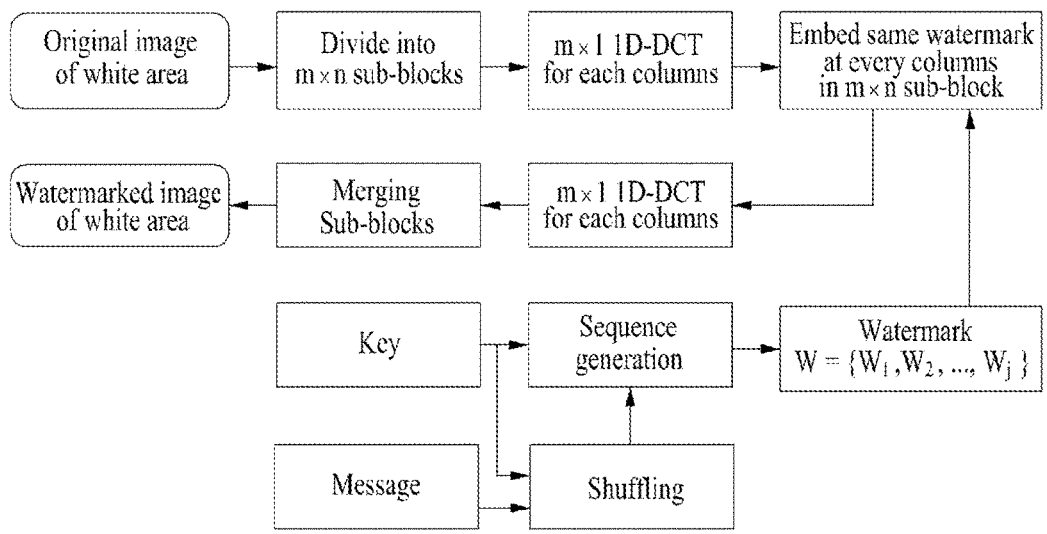
FIG. 3 is a flowchart illustrating a process of inserting a message watermark according to an embodiment.

As shown in FIG. 3, the message watermark embedding is performed through following steps.

(1) Dividing (or partitioning) into sub-blocks (or blocks): An image of (w−d)×(h−2d) is divided into sub-blocks of size m×n. M(=floor((w−d)/m))×N(=floor((h−2d)/n)) represents the number of sub-blocks, and each sub-block is defined by Bpq. However, since one watermark is embedded in each block, the number of whole watermarks is M×N.

(2) 1D-DCT every column: All columns of each block are transformed by using 1D-DCT.

(3) Data encoding: According to the present invention, a pseudo-random sequence is used as a watermark pattern. A group of pseudo-random sequences having a suitable length is generated according to the number of bits inserted by each watermark. For example, when λ bits are inserted into each watermark, the sequence is set $\mathbb{W}=\{W_0, W_1, \ldots, W_{2^\lambda}\}$.

Next, after a message is shuffled for security, messages and watermarks corresponding to the messages are assigned to sub-blocks, respectively. For example, if three-bit messages of 0b001(=1) and 0b111(=7) are to be inserted into sub-blocks $B_{11}$ and $B_{12}$, a watermark to be inserted into sub-block $B_{11}$ is $W_1$ and a watermark to be inserted into sub-block $B_{12}$ is $W_7$.

(4) Watermark embedding: According to the present invention, a watermark is inserted through a spread-spectrum scheme. The watermark inserted signal $S'=\{s'_1, s'_2, \ldots, s'_L\}$ is generated by inserting the watermark vector $W_b=\{w_{b1}, w_{b2}, \ldots, w_{bL}\}$ generated in the step (3) into signal $S=\{s_1, s_2, \ldots, s_t\}$ obtained through the DCT-transformation in the step (2). According to the present invention, an intermediate frequency value may be selected with respect to signal S for the purpose of robustness and invisibility and the embedding may be expressed as following Equation 12.

$$s'_i = s_i + \alpha |s_i| w_{bi}, (1 \leq i \leq L) \qquad \text{[Equation 12]}$$

Wherein α represents intensity of a watermark and L represents a vector length.

Equation 12 is repeatedly operated for all columns in a block and the steps are repeated for all blocks.

(5) Merging of 1D-IDCT and sub-blocks: The image into which a watermark is inserted is restored by using adversarial operations of the steps (1) and (2).

Hereinafter, a process of extracting a watermark according to the present invention will be described. The process of extracting a watermark according to the present invention first performs the template extraction in order to synchronize a geometric specification of a distorted image, such as a size, a location, etc., with that of an original image and then, extracts a message watermark by using the original image and the synchronized image.

1. Template Extraction and Image Synchronization

The template extraction (or decoding) finds a template inserted location through a specific scheme such as an exhaustive scheme for all scaling factors while moving to each pixel.

Figure 5:
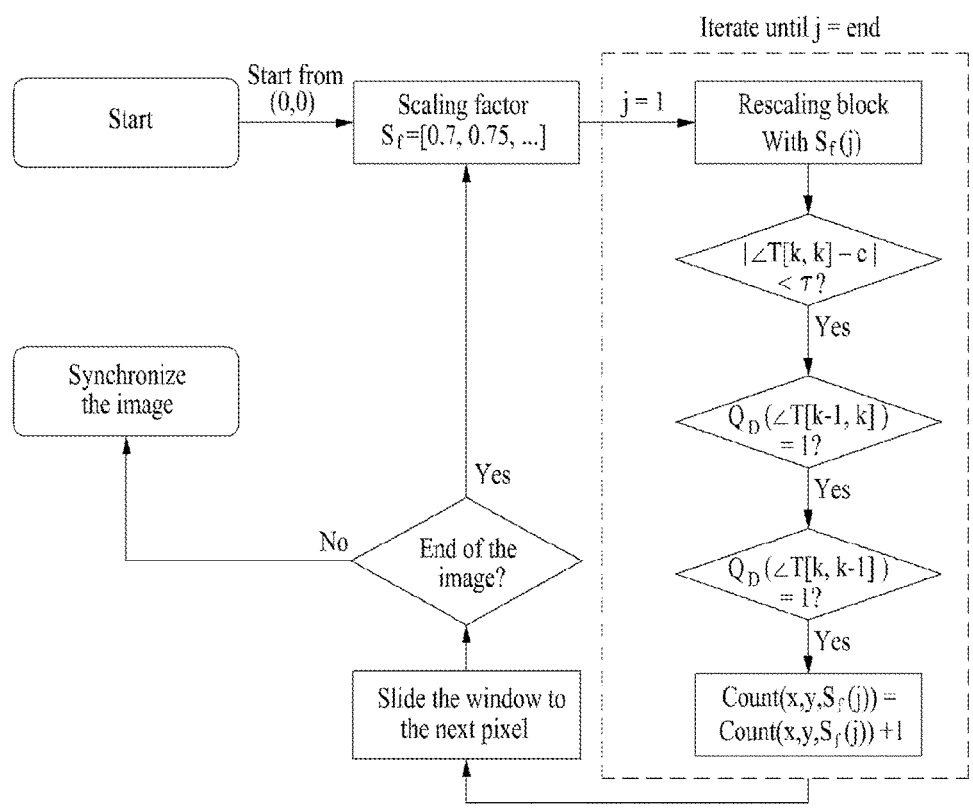
FIG. 5 is a flowchart illustrating a process of extracting a template watermark according to an embodiment.

In this case, according to the present invention, template 1 which is the most rapidly extractable is extracted. When template 1 is extracted, templates 2 and 3 are sequentially extracted in a hierarchical structure As shown in FIG. 5, the template extracting process may be implemented through following steps and start to extract a template from (x, y)=(0, 0).

(1) Scaling factor selection: While scaling factor $S_f(j)$ is changed from j=1 to j=end, the template extracting process is repeatedly performed, where $S_f$ is a group of scaling factors used for the template extraction. A step size of a scaling factor may be determined based on the calculation amount and accuracy. It is preferable to determine a step size excellent in the calculation amount and accuracy, for example, as 0.05.

(2) Image rescaling: An image is rescaled with a selected scaling factor.

(3) Block DFT: 2D block DFT is applied to block t. The used 2D block t is expressed as t=image$_r$(x$_r$:x$_r$+d, y$_r$:y$_r$+d), where d represents a size of the block used when a template is inserted, (x$_r$, y$_r$) represents the result of rescaling location (x, y) of a current pix, and image$_r$ represents a rescaled image.

(4) Extraction of template 1: Template 1 may be extracted through following Equation 13.

$$|\angle T[k,k]+c| < \tau \qquad \text{[Equation 13]}$$

When the condition of Equation 13 is satisfied, next step (5) is performed. When the condition of Equation 13 is not satisfied, the template extracting process goes back to step (1) to be performed with another scaling factor.

(5) Extraction of template 2: A bit inserted into $\angle T[k-1, k]$ is confirmed using IAQIM. In this case, the bit inserted into $\angle T[k-1, k]$ may be confirmed through following Equation 14.

$$Q_D(\theta) = \begin{cases} \text{bit} = 0, \text{ if } \left\lfloor \dfrac{\theta}{\frac{\Delta}{2}} \right\rfloor \bmod 4 \neq 0 \\ \text{bit} = 1, \text{ if } \left\lfloor \dfrac{\theta}{\frac{\Delta}{2}} \right\rfloor \bmod 4 = 0 \end{cases} \quad \text{[Equation 14]}$$

When $Q_D([T[k-1, k]])=1$, that is, the detected bit is 1, the process goes to a next step.

(6) Extraction of template 3: The same step as step (5) is performed for $\angle T[k, k-1]$. That is, the bit inserted into $\angle T[k, k-1]$ is confirmed using IAQIM.

(7) Plus counting: 1 is added to a count of corresponding $(x, y, S_f(j))$, wherein $(x, y)$ represents a location of a pixel and $S_f(j)$ is a scaling factor. The probability of plus count due to false-positive is the product of the probability $(2\tau/2\pi)$ of detecting template 1 in the step (4), the probability (1/4) of detecting template 2 of the step (5) and the probability (1/4) of detecting template 3 of the step (5), that is, $(2\tau/2\pi)\times 1/4\times 1/4=\tau/(16\pi)$.

The steps (1) to (7) are repeated for all pixels $(x, y)$ about $(w\times h)$ times. The obtained count may have following characteristics: (1) Only a specific $S_f$ has a high count value and (2) the specific $x$ and $y$ of corresponding $S_f$ have high count values. The reason of (1) is because the template is well detected only when the rescaling is performed with an attached scaling factor. The reason of (2) is because a template is repeatedly inserted into specific $x$ and $y$. An image may be synchronized by using the above characteristics as follows.

(1) sum(count(:, y)) is calculated for all $S_f$.
(2) The greatest value max(sum(count(:, y))) among the values of calculated sum(count(:, y)) for all the $S_f$ is found and $S_f(j)$ having the corresponding value is selected.
(3) y positions of the greatest two counts for the selected $S_f$ are defined as $y_1$ and $y_2$, and $y_1-y_2=h$.
(4) When $h/g \approx S_f(j)$, the image is rescaled with $g/h$. In addition, a vertical position of the image is adjusted with value $a_2$. The values $g$ and $a_2$ are predefined in the template inserting step.
(5) The horizontal position adjustment uses the values sum(count(x-w:x+w, :)) and $a_1$. Differently from the vertical position, the reason of adding the counts for windows 2W is because peak values are widely distributed due to DIBR. In this case, although an error occurs, since the message watermark is robust against the horizontal movement, the message watermark may be sufficiently detected even when an error exists.

The image synchronization of the present invention restores the geometric property of an image, from which a watermark is to detect, corresponding to the geometric property of an original image. A geometric property of a watermark detecting image, such as an image size, a watermark inserting area, etc., may be synchronized or restored correspond to that of the original image by rescaling the watermark detecting image into the size of the original image by using the scaling factor of the watermark detecting image, the inserting area of the detected template, and the inserting area of the template watermark into the original image, and by moving (translation) the image to allow the template watermark inserting area of the rescaled watermark detecting area to correspond to the watermark inserting area of the watermark detecting image.

2. Rapid Template Extraction and Calculation Amount

A template has a hierarchical structure. When a calculation amount for extracting template 1, which is the first stage of the hierarchical structure, is reduced, the whole calculation amount may be greatly reduced. A scheme of rapidly extracting template 1 may be implemented through following two properties. Before describing the scheme, the notations may be defined as following Equation 15.

$$F[u, v] = F\left(\frac{u}{m}, \frac{v}{n}\right) = f \cdot M^{m,n}_{\frac{u}{m}, \frac{v}{n}} \quad \text{[Equation 15]}$$

The Equation 15 shows a matrix form of DFT, where $f$ represents a block matrix of a spatial domain, $F$ represents a DFT coefficient, $[u, v]$ represents discrete coordinates of a frequency domain, and $(u/m, v/n)$ represents continuous coordinates of a frequency domain.

M which is a DFT transformation matrix may be defined as following Equation 16.

$$M^{m,n}_{\xi_1,\xi_2} = \frac{1}{\sqrt{m \cdot n}} \begin{bmatrix} e^{-j2\pi(0\xi_1+0\xi_2)} & e^{-j2\pi(1\xi_1+0\xi_2)} & \cdots & e^{-j2\pi((m-1)\xi_1+0\xi_2)} \\ e^{-j2\pi(0\xi_1+1\xi_2)} & e^{-j2\pi(1\xi_1+1\xi_2)} & \cdots & e^{-j2\pi((m-1)\xi_1+1\xi_2)} \\ \vdots & \vdots & \ddots & \vdots \\ e^{-j2\pi(0\xi_1+(n-1)\xi_2)} & e^{-j2\pi(1\xi_1+(n-1)\xi_2)} & \cdots & e^{-j2\pi((m-1)\xi_1+(n-1)\xi_2)} \end{bmatrix} \quad \text{[Equation 16]}$$

Wherein, $\xi_1$, $\xi_2$ represent continuous frequencies to be transformed, and $(m, n)$ represents a matrix size (or a block size).

(1) Property 1: Even though a block size is reduced through cropping, the phase is maintained at the same frequency. For example, even though a right lower part of a block is cropped, the phase is maintained at the same frequency, This will be described with reference to following Equation 17 and Equation 18.

$$b = \frac{\beta}{m} \begin{bmatrix} e^{j2\pi(0k_1+0k_2)} & \cdots & e^{j2\pi((m-1)k_1+0k_2)} \\ e^{j2\pi(0k_1+1k_2)} & \cdots & e^{j2\pi((m-1)k_1+1k_2)} \\ \vdots & \ddots & \vdots \\ e^{j2\pi(0k_1+(m-1)k_2)} & \cdots & e^{j2\pi((m-1)k_1+(m-1)k_2)} \end{bmatrix} \quad \text{[Equation 17]}$$

$$b_{cr} = \frac{\beta}{m} \begin{bmatrix} e^{j2\pi(0k_1+0k_2)} & \cdots & e^{j2\pi((c-1)k_1+0k_2)} \\ e^{j2\pi(0k_1+1k_2)} & \cdots & e^{j2\pi((c-1)k_1+1k_2)} \\ \vdots & \ddots & \vdots \\ e^{j2\pi(0k_1+(c-1)k_2)} & \cdots & e^{j2\pi((c-1)k_1+(c-1)k_2)} \end{bmatrix} \quad \text{[Equation 18]}$$

Wherein $b$ represents a block of $m\times m$ obtained through IDFT of $B(k_1, k_2)=\beta$, $b_{cr}$ represents a block of $c\times c$ corresponding to a left upper part of $b$, and $c$ is less than $m$.

Thus, since $b_{cr}$ is equal to $(c\beta)/(mM_{-k_1,-k_2}^{c,c})$, a phase of $b_{cr}$ may be expressed as following Equation 19.

$$B_{cr}(k_1, k_2) = b_{cr} \cdot M^{c,c}_{k_1,k_2} = \frac{c\beta}{m} M^{c,c}_{-k_1,-k_2} \cdot M^{c,c}_{k_1,k_2} = \frac{c}{m}\beta,$$ [Equation 19]

$$\angle B_{cr}(k_1, k_2) = \angle \frac{c}{m}\beta = \angle \beta = \angle B(k_1, k_2)$$

As known from Equation 19, it may be understood that the phase of a block size of c×c at ($k_1$, $k_2$) is equal to a phase of a block size of m×m at ($k_1$, $k_2$).

(2) Property 2: when one basic frequency component is obtained, a periphery frequency component may be predicted (or obtained) by using the basic frequency component and may be expressed as following Equation 20.

$$\begin{aligned} F(l_1, l_2) &= f \cdot M^{g,g}_{l_1,l_2} \\ &\quad f \cdot M^{g,g}_{k_1,k_2} \cdot M^{g,g}_{-k_1,-k_2} \cdot M^{g,g}_{l_1,l_2} \\ &= F(k_1, k_2) \cdot M^{g,g}_{-k_1,-k_2} \cdot M^{g,g}_{l_1,l_2} \\ &= F(k_1, k_2) \cdot T_f \end{aligned}$$ [Equation 20]

$\angle F(l_1,l_2) = \angle F(k_1,k_2) + \angle T_f$ may be known through Equation 20. Thus, the angel of the periphery frequency may be estimated from $F(k_1, k_2)$. $T_f$ may be a value previously calculated for $S_f$.

The two properties may be realized at an ideal condition. In a real image, interference may occur due to the periphery frequency. In Equation 19, as the number of crapped parts is increased and a distance between the basic frequency and the estimated periphery frequency is increased, the interference is increased. In this case, the problems caused due to the interference may be solved by increasing the amplitude of a template inserting frequency, for example, the basic frequency.

The template extraction using the two properties described above may be improved as shown in FIG. 6.

In FIG. 6, ds may be an arbitrary value less than d. As ds is reduced, the calculation amount is reduced and the robustness is also deteriorated. In the algorithm shown in FIG. 5, it is known that T[k, k] has the most calculation amount and the operation has exited from the for statement.

Since the calculation amount for the template extraction except for DFT is small, the calculation amount may be estimated based on the total number of DFT calculations as follows, wherein the calculation amount for DFT of a block of c×c may be defined as $C(DFT_{c,c})$ (1) Extraction of template 1: (Calculation amount for one coefficient in a block of ds×ds)×(Total number of pixels)= w×h×$C(DFT_{ds,ds})/d^2$s.

(2) Extraction of template 2: (Calculation amount for one coefficient in a block of d×d)×(Probability that template 1 is true)×(Total number of pixels)×(Total number of scaling factors)=$C(DFT_{d,d})/d^2 \times (2\tau/2\pi) \times w \times h \times length(S_f)$.

(3) Extraction of template 3: (Calculation amount for one coefficient in a block of d×d)×(Probability that template 1 is true)×(Probability that template 2 is true)×(Total number of pixels)×(Total number of scaling factors)=$C(DFT_{d,d})/d^2 \times (2\tau/2\pi) \times 1/4 \times w \times h \times length(S_f)$.

Following Table 3 shows the numbers of DFT calculations before and after a fast algorithm of FIG. 5 is applied.

TABLE 3

| | Template extraction | Past template extraction |
|---|---|---|
| Complexity caused by DFT | w × h × (15.7 $C(DFT_{10, 10})/10^2$) | w × h × ($C(DFT_{4, 4})/4^2$ + 2.7 $C(DFT_{10, 10})/10^2$) |

Table 3 shows the calculation amount in case that $\tau=\pi/6$, ds=4, d=10, and length($S_f$)=13. The DFT calculation used for a fast algorithm has a calculation amount equal to the calculation amount caused when performing DFT on a block of 4×4 one time and performing DFT on a block of 10×10 2.7 times for an image having a size of w×h.

In addition, since the same DFT matrix is used at all pixel positions, when such a DFT matrix is made into a table, there is no need to calculate a trigonometric function having a large calculation amount every time.

3. Extraction of Message Watermark in 1D-Transformed Domain

Figure 7:
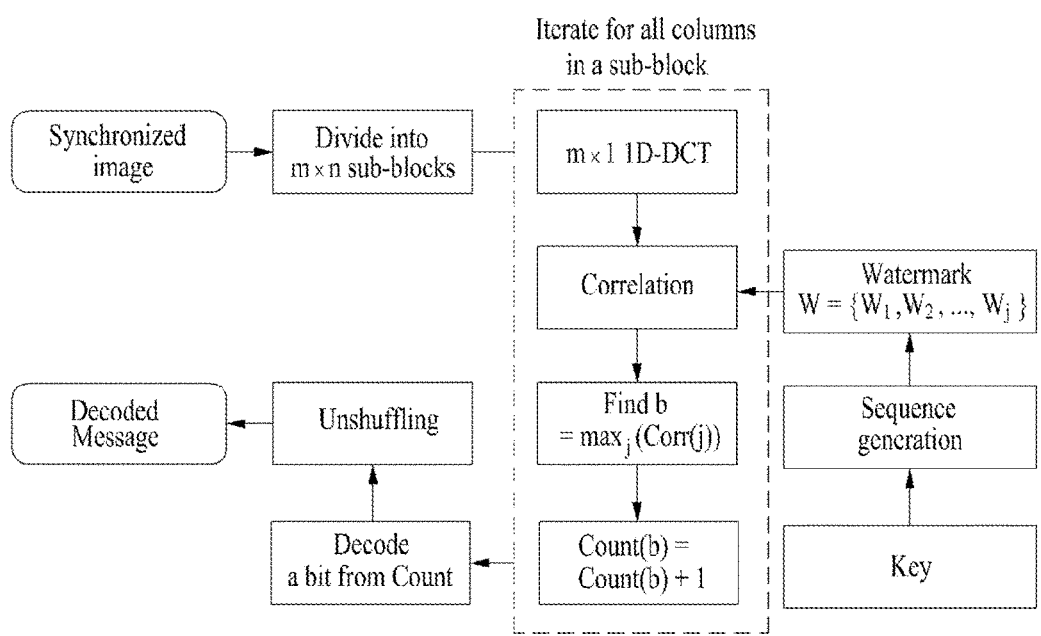
FIG. 7 is a flowchart illustrating a process of extracting a message watermark according to an embodiment.

A message watermark is extracted by using a synchronized image during template extraction. As shown in FIG. 7, the extraction of a message watermark is achieved through a following process.

(1)~(2) Division of blocks and 1D DCT: Similarly to the embedding of the message watermark, After an image of (w−2d)×(h−d) is divided into blocks (or sub-blocks) of an m×n size, 1D DCT is performed for each column. In this case, the position, at which the template is inserted, is excluded.

(3) Correlation: The intermediate frequency and the watermark (or watermark pattern) of 1D DFT are correlated with each other. The correlation may be expressed as following Equation 21.

$$\text{Corr}(j) = \frac{S^d \cdot W_j}{L} = \frac{1}{L} \sum_{i=1}^{L} s'_i \cdot w_{ji}, (j = 1, 2, 3, \ldots, 2^\lambda)$$ [Equation 21]

Wherein each symbol is the same as that used in the embedding process.

(4) Plus counting: When Corr(j) has the greatest value, j is b and 1 is added to count(b). Since the number of columns of a block is n, the steps (2) to (4) are repeated n times while moving one column by one column.

(5) Bit decoding: b allowing count(b) to have the greatest value is found from one block. Then, a bit is decoded with a value of the found b. For example, when a sequence is set $\mathbb{W} = W_0, \ldots W_{15}$ and count(3) has the greatest value, the decoded bit is 3=0b0011.

(6) Bit unshuffling: An original message watermark is restored by unshuffling the decoded bits of several blocks.

As described above, a watermarking method according to an embodiment of the present invention may provide a template watermarking scheme which is applicable to DIBR, robust against the DIBR transformation and protects copyright of a DIBR 3D image thereby.

Therefore, the amount of the damage may be reduced by detecting a DIBR 3D damaged due to illegality and the right of a copyright holder is protected, so that it may be encouraged to produce contents having a good quality.

Specifically, in case of a 3D image, since the producing cost of a 3D image is greater than that of a 2D image, the present invention may be more effective on the copyright protection of a 3D image.

In addition, differently from a 2D watermarking scheme of the related art, a watermarking method according to an embodiment of the present invention performs a watermarking operation by using a 1D signal, so that the watermarking method may have high robustness, guarantees a high quality of an image, a large inserting amount of data, and sufficient robust against various kinds of attacks, and protect the copyright even when a central image, or left or right eye image is illegally leaked.

Figure 8:
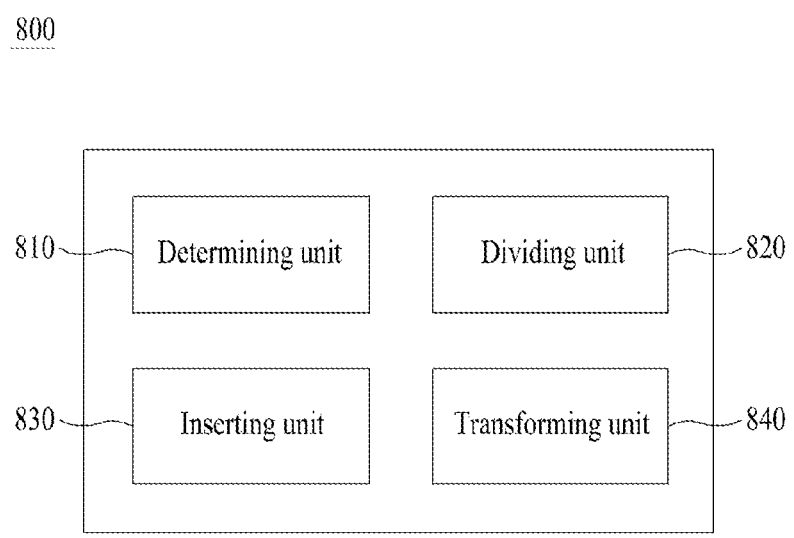
FIG. 8 is a block diagram illustrating a configuration of an apparatus for inserting a watermark based on a template.

FIG. 8 is a block diagram illustrating a configuration of an apparatus for inserting a watermark based on a template, which performs the process of inserting a watermark based on a template described above.

Referring to FIG. 8, an apparatus 800 for inserting a watermark according to an embodiment includes a determining unit 810, a dividing unit 820, an inserting unit 830 and a transforming unit 840.

The determining unit 810 determines a template watermark inserting area and a message watermark inserting area in a spatial domain of an image into which a watermark is to be inserted.

In this case, the determining unit 810 may determine a plurality of horizontal line areas having a constant width and spaced apart from each other by a predetermined interval and a vertical line area having a constant width in the spatial domain of the image as the template watermark inserting area, and may determine the remaining area except for the determined template watermark inserting area as the message watermark inserting area.

The dividing unit 820 divides the determined template watermark inserting area into a plurality of first blocks having a predetermined first size, and divides the determined message watermark inserting area into a plurality of second blocks having a predetermined second size.

In this case, the dividing unit 820 may divide the template watermark inserting area into the first blocks having a size smaller than that of a predetermined block size.

The inserting unit 830 transforms the template watermark inserting area into a frequency domain such that at least one preset template watermark is inserted, and transforms the message watermark inserting area into the frequency domain such that a preset message watermark is inserted.

In this case, the inserting unit 830 may insert a template watermark into the template watermark inserting area transformed into the frequency domain by using the IAQIM scheme. In detail, the inserting unit 830 inserts the template watermark into the first blocks transformed into the frequency domain and inserts the message watermark into the second blocks transformed into the frequency domain.

In addition, the inserting unit 830 may insert the same watermarks into the columns included in the second blocks transformed into the frequency domain, respectively.

The transforming unit 840 transforms the template watermark inserting area into which the template watermark is inserted into the spatial domain, and transforms the message watermark inserting area into which the message watermark is inserted into the spatial domain, such that an image into which the template and message watermarks inserted is generated.

Although not illustrated in FIG. 8, it is obvious to those skilled in the art that the apparatus 800 for inserting a watermark based on a template according to the present invention includes all operations and functions for the template watermark inserting process and the message watermark inserting process.

Figure 9:
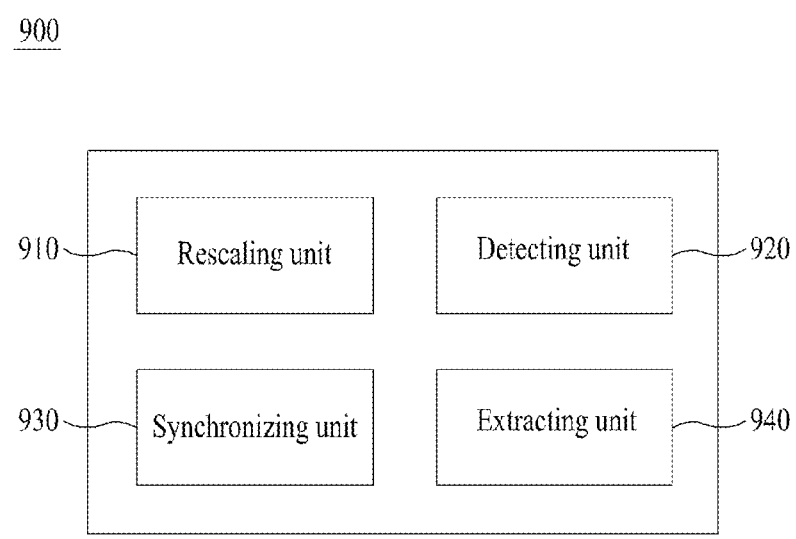
FIG. 9 is a block diagram illustrating a configuration of an apparatus for extracting a watermark based on a template according to an embodiment of the present invention.

FIG. 9 is a block diagram illustrating an apparatus for extracting a watermark based on a template according to an embodiment of the present invention, which performs the process of extracting a watermark based on a template described above.

Referring to FIG. 9, the apparatus 900 for extracting a watermark based on a template includes a rescaling unit 910, a detecting unit 920, a synchronizing unit 930, and an extracting unit 940.

The rescaling unit 910 rescales a watermark extracting image, from which a watermark is to be extracted, by using at least one predetermined scaling factor, respectively.

The detecting unit 920 detects a template watermark inserted area, into which at least one preset template watermark is inserted, based on the watermark extracting image rescaled by each of the scaling factors.

In this case, the detecting unit 920 transforms the watermark extracting image rescaled by the scaling factor from the spatial domain to the frequency domain. The detecting unit 920 may calculate a count value satisfying a preset template extracting condition with respect to the watermark extracting area rescaled by each of the scaling factors and transformed into the frequency domain, select a scaling factor having the highest value among the count values calculated with the scaling factors, and detect the template watermark inserting area from the watermark extracting image rescaled by the selected scaling factor and transformed into the frequency domain The detecting unit 920 may extract at least one template watermark from the watermark extracting image rescaled by the selected scaling factor and transformed into the frequency domain by using the IAQIM scheme, and may detect the template watermark inserting area based on the extracted template watermark.

The synchronizing unit 930 synchronizes the geometric property of the watermark extracting image with that of the original image based on the scaling factor and the detected template watermark inserting area.

In this case, the synchronizing unit 930 may generate the rescaled watermark extracting image by rescaling a size of the watermark extracting image to correspond to that of the original image by using the selected scaling factor, and may restore the watermark extracting image into a synchronized watermark extracting image by moving the rescaled watermark extracting image to allow the template watermark inserting area of the generated rescaled watermark extracting image to correspond to the template watermark inserting area of the original image. That is, the synchronizing unit 930 adjusts the geometric property of the watermark extracting image corresponding to that of the original image.

The extracting unit 940 extracts the message watermark from the preset message watermark inserting area of the watermark extracting image synchronized with the geometric property of the original image.

In this case, the extracting unit 940 may divide the message watermark inserting area into a plurality of blocks each having a predetermined size, may transform the divided blocks from the spatial domain to the frequency domain, respectively, and may extract the message watermark based on correlation between each of the blocks transformed into the frequency domain and a preset original message watermark.

Although not illustrated in FIG. 9, it is obvious to those skilled in the art that the apparatus 900 for extracting a watermark based on a template according to the present invention includes all operations and functions for the template watermark extracting process and the message watermark extracting process.

The apparatuses described herein may be implemented using hardware components, software components, and/or a combination thereof. For example, the apparatuses and the components described in the embodiments may be implemented using at least one general or special purpose computer, for example, a processor, a controller, an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device to be analyzed or processed by a processing device or to provide a command or data to a processor. The software also may be distributed over network coupled computer systems so that the software is stored and executed in a distributed fashion. The software and data may be stored by one or more computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of some embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware or devices may be configured to act as one or more software modules in order to perform the operations of the above-described embodiments, or vice versa.

It will be apparent to those skilled in the art that various modifications and variations can be made in the present invention without departing from the spirit or scope of the inventions. For example, the above-described techniques may be executed in an order different from that described in the description of the present invention, and/or the components of the above-described system, structure, equipment (or device), circuit, and so on, may be combined in a format different that of the above-described method according to the present invention, and an adequate result may be achieved even if the above-described components of the present invention are replaced by any other component or its equivalent.

Thus, it is intended that the present invention covers other realizations and other embodiments of this invention provided they come within the scope of the appended claims and their equivalents.

What is claimed is:

1. A method of inserting a watermark based on a template, the method comprising:
   determining a template watermark inserting area and a message watermark inserting area in spatial domain of an image;
   transforming the determined template watermark inserting area into a frequency domain to insert at least one preset template watermark and transforming the determined message watermark inserting area into a frequency domain to insert a preset message watermark; and
   transforming the template watermark inserting area, into which the at least one preset template watermark is inserted, into a spatial domain and transforming the message watermark inserting area, into which the preset message watermark is inserted, into a spatial domain,
   wherein a plurality of horizontal line areas, which have a predetermined width and are spaced apart from each other by a predetermined interval, and a vertical line area having the predetermined width are determined as the template watermark inserting area in the spatial domain of the image, and
   a remaining area except for the determined template watermark inserting area is determined as the message watermark inserting area.

2. The method of claim 1, further comprising dividing the determined template watermark inserting area into a plurality of first blocks each of which has a predetermined first size, and dividing the determined message watermark inserting area into a plurality of second blocks each of which has a predetermined second size,
   wherein the at least one preset template watermark is inserted into the plurality of first blocks transformed into the frequency domain, and the preset message watermark is inserted into the plurality of second blocks transformed into the frequency domain.

3. The method of claim 1, wherein the at least one preset template watermark is inserted into the template watermark inserting area which is transformed into the frequency domain through an improved angle quantization index modulation (IAQIM) scheme.

4. The method of claim 2, wherein the preset message watermark is equally inserted into each of columns included in each of the second blocks transformed into the frequency domain.

5. The method of claim 2, wherein the dividing of the determined template watermark inserting area comprises dividing the determined template watermark inserting area into the first blocks having the predetermined first size smaller than a predetermined size, or setting a transforming area corresponding to a first block having a small size.

6. An apparatus for inserting a watermark based on a template, the apparatus comprising:

a determining unit configured to determine a template watermark inserting area and a message watermark inserting area in spatial domain of an image;

an inserting unit configured to transform the determined template watermark inserting area into a frequency domain to insert at least one preset template watermark and to transform the determined message watermark inserting area into a frequency domain to insert a preset message watermark; and a transforming unit configured to transform the template watermark inserting area, into which the at least one preset template watermark is inserted, into a spatial domain and to transform the message watermark inserting area, into which the preset message watermark is inserted, into a spatial domain, wherein the determining unit determines a plurality of horizontal line areas, which have a predetermined width and are spaced apart from each other by a predetermined interval, and a vertical line area having the predetermined width as the template watermark inserting area in the spatial domain of the image, and determines a remaining area except for the determined template watermark inserting area as the message watermark inserting area.

7. The apparatus of claim 6, further comprising a dividing unit configured to divide the determined template watermark inserting area into a plurality of first blocks each of which has a predetermined first size, and to divide the determined message watermark inserting area into a plurality of second blocks each of which has a predetermined second size, wherein the inserting unit inserts the at least one preset template watermark into the plurality of first blocks transformed into the frequency domain, and inserts the preset message watermark into the plurality of second blocks transformed into the frequency domain.

8. The apparatus of claim 6, wherein the inserting unit inserts the at least one preset template watermark into the template watermark inserting area which is transformed into the frequency domain through an improved angle quantization index modulation (IAQIM) scheme.

9. The apparatus of claim 7, wherein the inserting unit equally inserts the preset message watermark into each of columns included in each of the second blocks transformed into the frequency domain.

10. The apparatus of claim 7, wherein the dividing unit divides the determined template watermark inserting area into the first blocks having the predetermined first size smaller than a predetermined size.

* * * * *